US012597683B2

(12) United States Patent
Park et al.

(10) Patent No.: US 12,597,683 B2
(45) Date of Patent: Apr. 7, 2026

(54) CURRENT COLLECTOR, BATTERY CELL, BATTERY PACK, AND VEHICLE INCLUDING THE SAME

(71) Applicant: LG ENERGY SOLUTION, LTD., Seoul (KR)

(72) Inventors: Sang-Jin Park, Daejeon (KR); Hong-Jae Kim, Daejeon (KR); Jong-Hoon Park, Daejeon (KR); Jae-Young Woo, Daejeon (KR); Jun-Su Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/741,471

(22) Filed: Jun. 12, 2024

(65) Prior Publication Data

US 2024/0421451 A1 Dec. 19, 2024

(30) Foreign Application Priority Data

Jun. 16, 2023 (KR) ........................ 10-2023-0077637
Mar. 4, 2024 (KR) ........................ 10-2024-0030857
May 23, 2024 (KR) ........................ 10-2024-0067269

(51) Int. Cl.
*H01M 50/578* (2021.01)
*H01M 10/04* (2006.01)
(Continued)

(52) U.S. Cl.
CPC ..... *H01M 50/578* (2021.01); *H01M 10/0431* (2013.01); *H01M 50/107* (2021.01);
(Continued)

(58) Field of Classification Search
CPC ......... H01M 10/0431; H01M 10/0587; H01M 2200/20; H01M 2220/20; H01M 50/107;
(Continued)

(56) References Cited

U.S. PATENT DOCUMENTS

2004/0241536 A1* 12/2004 Kim .................. H01M 50/3425
429/61
2013/0216871 A1 8/2013 Lee et al.
(Continued)

FOREIGN PATENT DOCUMENTS

CN 218039287 U 12/2022
CN 218996882 U 5/2023
(Continued)

OTHER PUBLICATIONS

KR 20220107131 machine translation (Year: 2025).*
Written Opinion of the International Searching Authority for PCT/KR2024/008272 (PCT/ISA/237) mailed on Sep. 30, 2024.

*Primary Examiner* — Lingwen R Zeng
(74) *Attorney, Agent, or Firm* — Birch, Stewart, Kolasch & Birch, LLP

(57) ABSTRACT

A battery cell includes: an electrode assembly including a first electrode and a second electrode with a separator interposed therebetween, and the first electrode, second electrode and separator are wound around a winding axis, wherein the first electrode includes a first uncoated portion, which is not coated with an active material layer; a battery housing having an opening and that accommodates the electrode assembly through the opening; and a current collector including a support portion, a tab coupling portion, and a housing coupling portion. A fracture portion is provided at a boundary between the support portion and the tab coupling portion.

18 Claims, 15 Drawing Sheets

(51) Int. Cl.
    *H01M 50/107*     (2021.01)
    *H01M 50/533*     (2021.01)
    *H01M 50/536*     (2021.01)
    *H01M 50/538*     (2021.01)

(52) U.S. Cl.
    CPC ........ *H01M 50/533* (2021.01); *H01M 50/536*
    (2021.01); *H01M 50/538* (2021.01); *H01M*
    *2200/20* (2013.01); *Y02E 60/10* (2013.01);
    *Y02P 70/50* (2015.11)

(58) Field of Classification Search
    CPC ............. H01M 50/533; H01M 50/536; H01M
    50/538; H01M 50/578; Y02E 60/10;
    Y02P 70/50
    See application file for complete search history.

(56)             References Cited

U.S. PATENT DOCUMENTS

2014/0315055 A1*  10/2014  Byun .................. H01M 50/583
                                         429/61
2015/0072179 A1    3/2015  Itabashi
2024/0088425 A1    3/2024  Lee et al.

FOREIGN PATENT DOCUMENTS

| | | | |
|---|---|---|---|
| EP | 4 343 952 | A1 | 3/2024 |
| JP | 2012-156102 | A | 8/2012 |
| KR | 10-2012-0039181 | A | 4/2012 |
| KR | 10-2014-0114429 | A | 9/2014 |
| KR | 10-2020-0029871 | A | 3/2020 |
| KR | 10-2022-0105148 | A | 7/2022 |
| KR | 10-2022-0107131 | A | 8/2022 |
| KR | 10-2023-0049638 | A | 4/2023 |
| KR | 10-2519837 | B1 | 4/2023 |
| WO | WO 2022/072641 | A1 | 4/2022 |

* cited by examiner

CURRENT COLLECTOR, BATTERY CELL, BATTERY PACK, AND VEHICLE INCLUDING THE SAME

CROSS-REFERENCE TO RELATED APPLICATIONS

This application is based on and claims priority from Korean Patent Application No. 10-2023-0077637 filed on Jun. 16, 2023, with the Korean Intellectual Property Office, the disclosure of which is incorporated herein in its entirety by reference.

This application is based on and claims priority from Korean Patent Application No. 10-2024-0030857 filed on Mar. 4, 2024, with the Korean Intellectual Property Office, the disclosure of which is incorporated herein in its entirety by reference.

This application is based on and claims priority from Korean Patent Application No. 10-2024-0067269 filed on May 23, 2024, with the Korean Intellectual Property Office, the disclosure of which is incorporated herein in its entirety by reference.

TECHNICAL FIELD

The present disclosure relates to a current collector, a battery cell, a battery pack, and a vehicle including the same.

BACKGROUND

Secondary batteries, which are highly applicable depending on a product group and have electrical characteristics such as high energy density, are universally applied not only to portable devices, but also to electric vehicles (EVs), hybrid vehicles (HEVs), or the like which are driven by an electrical drive source. These secondary batteries not only have the primary advantage of being able to dramatically reduce the use of fossil fuels, but also have the advantage of not generating any by-products due to energy use. Therefore, the secondary batteries are attracting attention as a new energy source to improve eco-friendliness and energy efficiency.

The types of currently widely used secondary batteries include, for example, lithium ion batteries, lithium polymer batteries, nickel cadmium batteries, nickel hydrogen batteries, and nickel zinc batteries. The operating voltage of these unit secondary battery cells, i.e., unit battery cells, is about 2.5V to 4.5V. Therefore, when a higher output voltage is required, a battery pack may be formed by connecting a plurality of battery cells in series. In addition, a battery pack may be formed by connecting multiple battery cells in parallel depending on a charge/discharge capacity required for the battery pack. Accordingly, the number of battery cells included in the battery pack may be set in various ways depending on the required output voltage and/or the charge/discharge capacity.

In the meantime, when the heat in a battery cell is not properly managed, a phenomenon called thermal runaway may occur, in which an electrochemical cell heats itself in an uncontrollable way, thereby changing the environment toward a direction that further accelerates temperature changes.

SUMMARY

The present disclosure provides a battery cell, in which a flame generated inside the battery cell may be smoothly discharged when thermal runaway occurs.

Furthermore, the present disclosure prevents a beading portion of a battery cell from being damaged when thermal runaway occurs.

The present disclosure prevents a pinhole phenomenon from occurring in a beading portion of a battery cell when thermal runaway occurs.

However, the technical problems to be solved by the present disclosure are not limited to the above-mentioned problems, and other problems not mentioned above may be clearly understood by a person ordinarily skilled in the art from the description of the disclosure set forth below.

The battery cell according to an embodiment of the present disclosure includes: an electrode assembly including a first electrode, a second electrode and a separator interposed therebetween, and the first electrode, second electrode, and separator are each wound around a winding axis to define a core and an outer peripheral surface, wherein the first electrode includes a first uncoated portion, which is not coated with an active material layer, along the winding direction; a battery housing having an opening at one side thereof and configured to accommodate the electrode assembly through the opening; and a current collector including a support portion disposed on the electrode assembly, a tab coupling portion extending from the support portion and coupled to the first uncoated portion, and a housing coupling portion extending from the support portion and electrically coupled to the inner surface of the battery housing. A fracture portion having lower strength than a surrounding region is provided at the boundary between the support portion and the tab coupling portion.

For example, the fracture portion includes a notch line including a plurality of notches.

The current collector according to an embodiment of the present disclosure may include a through hole that passes through the current collector.

For example, the through hole may be located on the notch line.

According to an embodiment of the present disclosure, the through hole may be located at the center of the boundary between the support portion and the tab coupling portion.

According to an embodiment of the present disclosure, at least one through hole may be provided on the support portion.

According to an embodiment of the present disclosure, at least one through hole may be provided on the tab coupling portion.

According to an embodiment of the present disclosure, the notch line may be configured to have a curved shape.

According to an embodiment of the present disclosure, the tab coupling portion may be configured to have a larger width than the housing coupling portion.

According to an embodiment of the present disclosure, the first uncoated portion and the tab coupling portion may be coupled by welding along the radial direction of the electrode assembly.

For example, a weld bead may be formed between the first uncoated portion and the tab coupling portion.

The weld bead may form a linear welding pattern extending along the radial direction of the electrode assembly.

The welding pattern is configured to be perpendicular to the notch line.

For example, the tab coupling portion may be located below the bottom surface of the beading portion.

According to an embodiment of the present disclosure, a current collector may include: a support portion disposed on the electrode assembly; a tab coupling portion extending from the support portion and coupled to the first uncoated portion; and a housing coupling portion extending from the support portion and electrically coupled to an inner surface of the battery housing. A fracture portion having lower strength than a surrounding region may be provided at the boundary between the support portion and the tab coupling portion.

Alternatively, the present disclosure provides a battery pack including at least one battery cell according to the above-described embodiment.

In addition, the present disclosure provides a vehicle including at least one battery pack according to the above-described embodiment.

In addition, the present disclosure provides a battery module including at least one battery cell according to the above-described embodiment.

The present disclosure provides an energy storage system including at least one battery module according to the above-described embodiment.

A battery cell according to another embodiment of the disclosure includes: an electrode assembly including a first electrode and a second electrode with a separator interposed therebetween, and the first electrode, second electrode and separator are wound around a winding axis to define a core and an outer peripheral surface, wherein the first electrode includes a first uncoated portion, which is not coated with an active material layer, along the winding direction; a battery housing having an opening at one side thereof and that accommodates the electrode assembly through the opening; and a current collector including a support portion disposed on the electrode assembly, a tab coupling portion extending from the support portion and coupled to the first uncoated portion, and a housing coupling portion extending from the support portion and electrically coupled to the inner surface of the battery housing. The current collector is provided with a channel or path that discharges a flame to the outside when thermal runaway occurs in the electrode assembly.

For example, the channel or path includes a fracture portion, which has lower strength than a surrounding region, at a boundary between the support portion and the tab coupling portion, and the fracture portion includes a notch line including a plurality of notches.

According to an embodiment of the present disclosure, when thermal runaway occurs, a flame generated inside a battery cell may be smoothly discharged.

According to an embodiment of the present disclosure, the beading portion of the battery cell may be effectively prevented from being damaged when thermal runaway occurs.

For example, the present disclosure is capable of preventing a pinhole phenomenon from occurring in the beading portion of the battery cell when thermal runaway occurs.

However, the effects capable of being achieved through the present disclosure are not limited to the above-mentioned effects, and other technical effects not mentioned above may be clearly understood by those skilled in the art from the description of the disclosure set forth below.

BRIEF DESCRIPTION OF THE DRAWINGS

The following drawings attached hereto exemplify embodiments of the present disclosure and serve to help further understand the technical idea of the present disclosure together with the detailed description of the disclosure to be described later. Therefore, the present disclosure should not be construed as being limited to the matters illustrated in the drawings.

Figure 1:
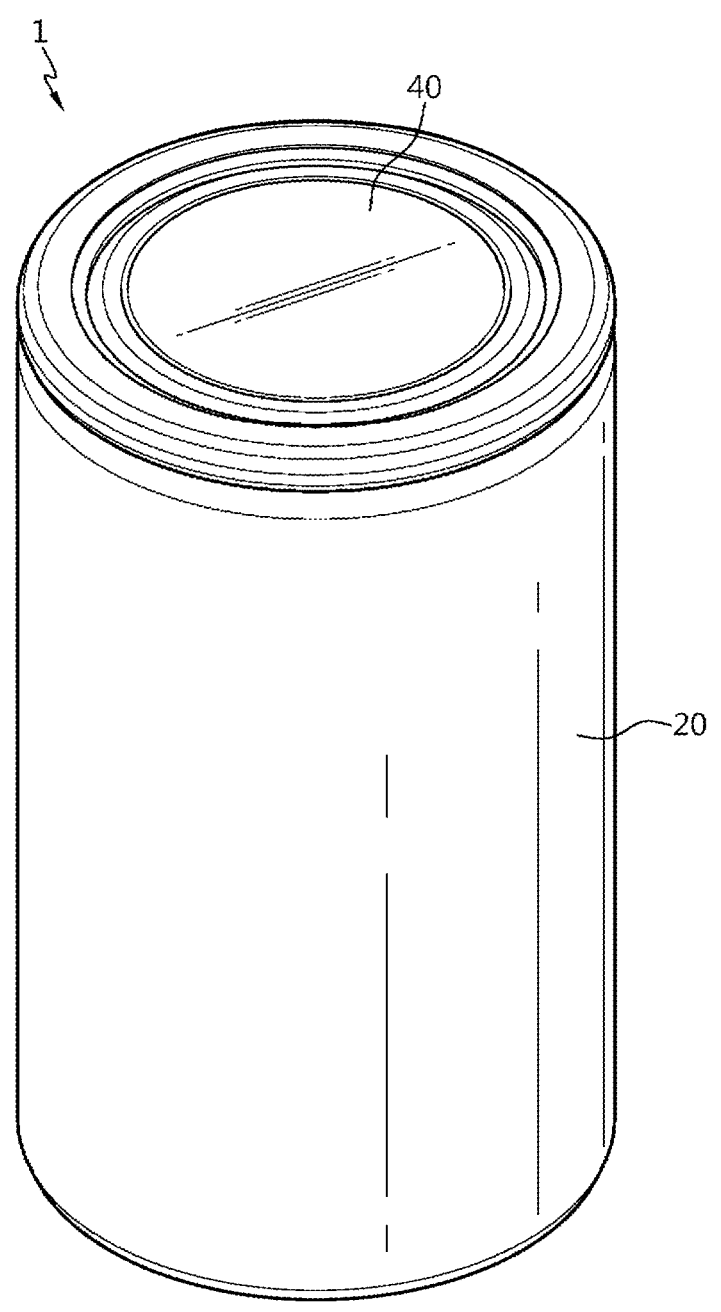
FIG. 1 is a view illustrating a battery cell according to an embodiment of the present disclosure.

In some of the accompanying drawings, corresponding components are given the same reference numerals. A person ordinarily skilled in the art will appreciate that the drawings illustrate elements simply and clearly and are not necessarily drawn to scale. For example, in order to aid understanding of various embodiments, the dimensions of some elements illustrated in the drawings may be exaggerated compared to other elements. In addition, elements that are useful or essential in commercially implementable embodiments but are known in the art may often not be described in order to avoid impeding the understanding of the spirit of various embodiments of the present disclosure.

DETAILED DESCRIPTION

Hereinafter, embodiments of the present disclosure will be described with reference to the attached drawings. Prior to this, the terms and words used in the specification and claims should not be construed as limited to their ordinary or dictionary meanings, but should be construed as meanings and concepts consistent with the technical idea of the present disclosure based on a principle that the inventor may appropriately define the concepts of terms in order to explain his or her invention in the best way. Accordingly, since the embodiments described in this description and the configurations illustrated in the drawings are merely some exemplary embodiments of the present disclosure, and do not represent all the technical ideas of the present disclosure, it should be understood that at the time of filing the present application, there may be various equivalents and modifications that may replace the embodiments.

In addition, in order to aid understanding of the disclosure, the attached drawings are not drawn to scale and the dimensions of some components may be exaggerated. In addition, the same reference numbers may be assigned to the same components in different embodiments.

The description that two objects of comparison are the same means that the objects are "substantially the same". Therefore, "substantially the same" may include cases where there is a deviation that is considered low in the art, for example, a deviation of less than 5%. In addition, uniformity of a parameter in a certain region may mean uniformity from an average perspective.

Although the terms such as first and second are used in order to describe various elements, the components are, of course, not limited by these terms. These terms are only used to distinguish one component from another component, and the first component may be, of course, the second component unless specifically stated otherwise.

Throughout the specification, unless specifically stated otherwise, each component may be singular or plural.

When an arbitrary component is described as being disposed at the "top (or bottom)" of a component or "above (or below)" the component, it may mean that the arbitrary component is disposed in contact with the top surface (or bottom surface) of the component, as well as that another component may be interposed between the component and the arbitrary component disposed above (or below) the component.

In addition, when an arbitrary component is described as being "connected," "coupled," or "join" to another component, it should be understood that the components may be directly connected or joined to each other, but another component may be "interposed" between individual components or the individual components may be "connected," "coupled," or "joined" to each other via another component.

Throughout the description, when referred to as "A and/or B," this means A, B, or A and B unless specifically stated otherwise, and when referred to as "C to D," this means C or more and D or less unless specifically stated otherwise.

As used herein, terms "about," "approximately," and "substantially" are used to mean a range of numerical values or degrees, or approximations thereof, considering inherent manufacturing and material tolerances, and are used to prevent an infringer from unfairly exploiting the described content where precise or absolute values are mentioned to aid understanding of the present disclosure.

For convenience of explanation, in this description, the direction following the longitudinal direction of the winding axis of the electrode assembly 10 wound in a jelly roll shape will be referred to as an axial direction Y. In addition, the direction surrounding the winding axis will be referred to as the circumferential direction or peripheral direction X. In addition, a direction close to or away from the winding axis will be referred to as a radial direction. Among these, the direction close to the winding axis will be referred to as the centripetal direction, and the direction away from the winding axis will be referred to as the centrifugal direction.

When thermal runaway occurs in a secondary battery, a pinhole may occur on the side surface of the battery cell. In this case, the generated thermal runaway phenomenon may directly damage nearby battery cells, causing the nearby battery cells to explode one after another, and potentially causing chain ignition. Therefore, there is a need to reduce the frequency of occurrence of the pinhole phenomenon.

In addition, in view of the fact that the frequency of occurrence of a pinhole phenomenon in the beading portion is high when thermal runaway occurs, considering that when thermal runaway occurs, a flame of explosion is not smoothly discharged to the venting portion and is directed to a side portion, thereby directly coming into contact with the beading portion located nearby, generating pinholes, the present disclosure provides a structure of an electrode assembly through which the flame may be smoothly discharged.

For example, a battery cell according to an embodiment of the present disclosure is provided with a channel or path through which a flame of explosion may be smoothly discharged to the venting portion when thermal runaway occurs.

Figure 2:
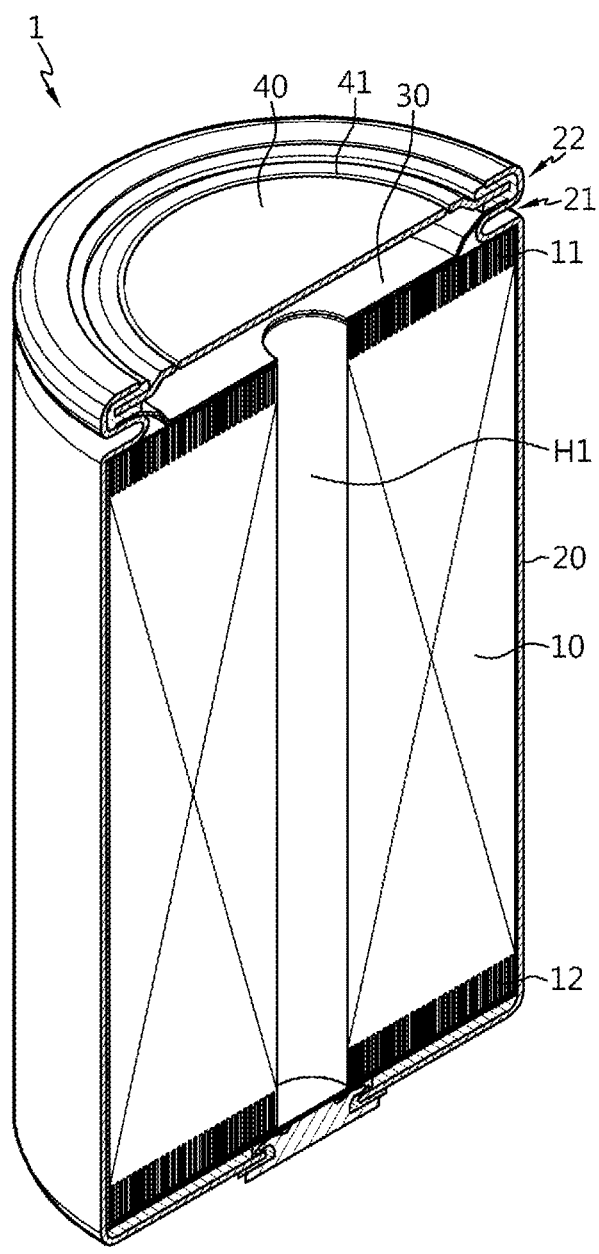
FIG. 2 is a vertical cross-sectional view of FIG. 1.
Figure 3:
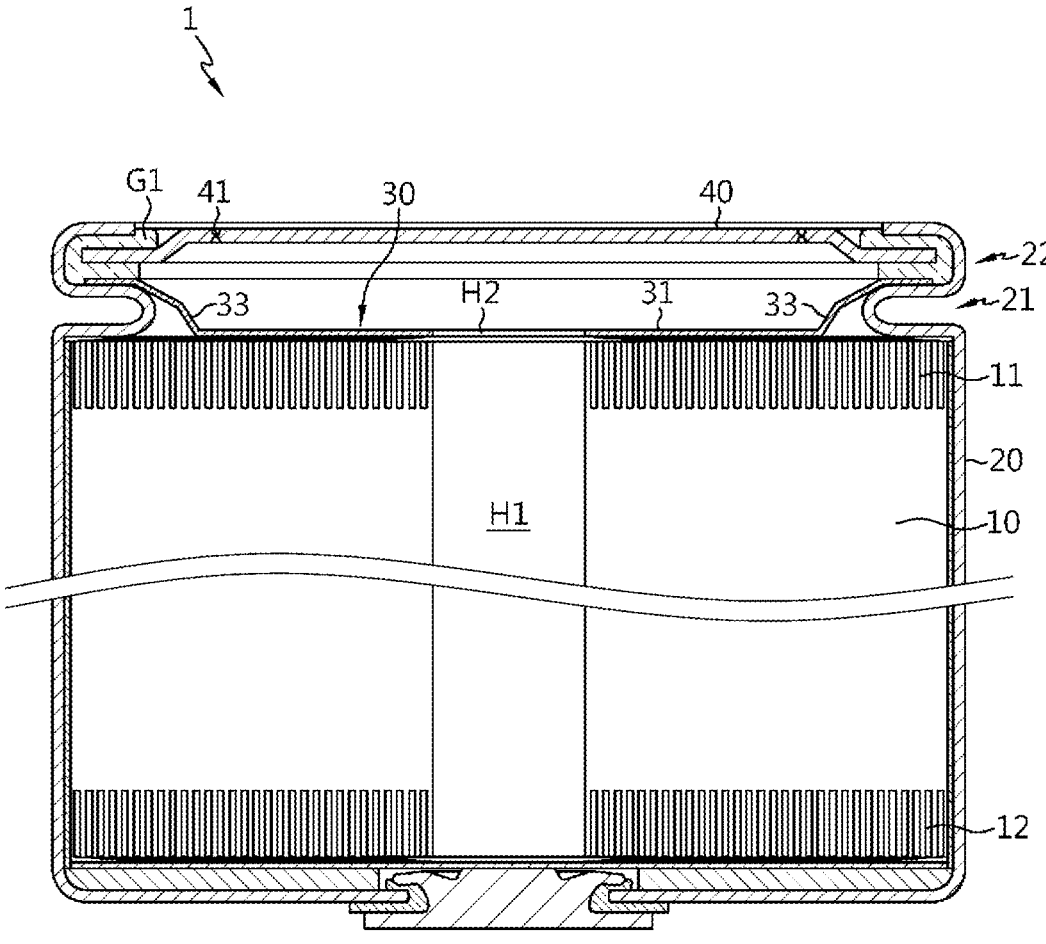
FIG. 3 is a vertical cross-sectional view of the battery cell of FIG. 1.

FIG. 1 is a view illustrating a battery cell 1 according to an embodiment of the present disclosure, and FIG. 2 is a vertical cross-sectional perspective view of FIG. 1. FIG. 3 is a vertical cross-sectional view of the battery cell 1 of FIG. 1.

Referring to FIGS. 1 and 2, the battery cell 1 according to an embodiment of the present disclosure includes an electrode assembly 10, a battery housing 20, and a current collector 30. The battery cell 1 may further include a housing cover 40. The present disclosure is not limited by the shape of the battery, and may also be applied to batteries having other shapes, such as a prismatic battery.

Referring to FIGS. 2 and 3, the electrode assembly 10 includes a first uncoated portion 11 and a second uncoated portion 12. For example, the electrode assembly 10 according to an embodiment has a winding structure in which first and second electrodes are wound around a winding axis with a separator interposed therebetween to define a core and an outer circumferential surface. For example, the electrode assembly 10 applied to the present disclosure may be a jelly-roll type electrode assembly 10. In this case, an additional separator may be provided on the outer circumferential surface of the electrode assembly 10 to insulate the electrode assembly from the battery housing 20.

According to an embodiment of the present disclosure, the first electrode may include a first electrode current collector and a first electrode active material applied onto one or both surfaces of the first electrode current collector. An uncoated portion to which the first electrode active material is not applied exists in one end portion of the first electrode in the width direction of the first electrode (a direction parallel to the height direction of the battery cell 1 illustrated in FIG. 1). For example, the first electrode includes an uncoated portion that is not coated with an active material on a long side end portion along the winding direction and exposed to the outside of the separator. Hereinafter, the uncoated portion functioning as a first electrode tab will be referred to as a first uncoated portion 11. The first uncoated portion 11 is provided in the upper portion of the electrode assembly 10 accommodated in the battery housing 20 in the height direction (a direction parallel to the height direction of the battery cell 1 illustrated in FIG. 1). For example, the first electrode includes the first uncoated portion 11 that is not coated with an active material layer in the long side end portion and is exposed to the outside of the separator, and at least a portion of the first uncoated portion 11 itself is used as an electrode tab. The first uncoated portion 11 may be, for example, a negative electrode tab.

Meanwhile, at least a portion of the first uncoated portion 11 may include a plurality of segment pieces split along the winding direction of the electrode assembly 10. In this case, the plurality of segment pieces may be bent along the radial direction of the electrode assembly 10.

Referring to FIGS. 2 and 3, according to an embodiment of the present disclosure, the plurality of bent segment pieces of the first uncoated portion 11 may be overlapped in several layers to form a bent surface. In this case, a tab coupling portion 32 of the current collector 30, which will be described later, may be coupled to the bent surface. The tab coupling portion 32 may be coupled to a region where the plurality of segment pieces are overlapped in several layers. In this case, welding may be performed on a predetermined region in the state where the tab coupling portion 32 is seated on the bent surface of the first uncoated portion 11. For example, the tab coupling portion 32 may be coupled to the region where the plurality of segment pieces of the first uncoated portion 11 are overlapped in several layers. For example, as can be seen from FIG. 5, the tab coupling portion 32 may have at least one welded portion welded to predetermined regions when seated on the bent surface of the first uncoated portion 11.

According to an embodiment of the present disclosure, the second electrode may include a second electrode current collector and a second electrode active material applied onto one or both surfaces of the second electrode current collector. An uncoated portion to which the second electrode active material is not applied exists in the other end portion of the second electrode in the width direction of the second electrode (a direction parallel to the height direction of the battery cell 1 illustrated in FIG. 1). For example, the second electrode includes an uncoated portion that is not coated with an active material on a long side end portion along the winding direction and exposed to the outside of the separator. Hereinafter, the uncoated portion functioning as a first electrode tab will be referred to as a second uncoated portion 12. For example, the second uncoated portion 12 is provided in the lower portion in the height direction of the electrode assembly 10 accommodated in the battery housing 20. For example, the second electrode includes the second uncoated portion 12 that is not coated with an active material layer in the long side end portion and is exposed to the outside of the separator, and at least a portion of the second uncoated portion 12 itself is used as an electrode tab. The second uncoated portion 12 may be, for example, a positive electrode tab.

Meanwhile, in the present disclosure, the positive electrode active material coated on a positive electrode plate and the negative electrode active material coated on a negative electrode plate may be used without limitation as long as they are active materials known in the art.

Referring to FIG. 1, according to an embodiment of the present disclosure, the battery housing 20 is a substantially cylindrical receptor with an opening formed at one side thereof, and is made of a conductive metal material. The side surface of the battery housing 20 and the bottom surface located at the side opposite to the opening are generally formed integrally as one piece. For example, the battery housing 20 generally has an open top and a closed bottom in the height direction. The bottom surface of the battery housing 20 may have a substantially flat shape. The battery housing 20 accommodates the electrode assembly 10 through the opening formed at the one side in the height direction. The battery housing 20 is also capable of accommodating electrolyte through the opening.

For example, the battery housing 20 includes a beading portion 21 formed at the end portion adjacent to the opening provided at the top of the battery housing 20. The battery housing 20 further includes a crimping portion 22 formed on the beading portion 21. The beading portion 21 has a shape in which the outer circumferential surface of the battery housing 20 is pressed to a predetermined depth. Alternatively, the beading portion 21 may be pressed inward in the region between the opening formed at the one side of the battery housing 20 and an accommodation portion configured to accommodate the electrode assembly 10.

According to an embodiment of the present disclosure, the beading portion 21 is formed in the upper portion of the electrode assembly 10. The inner diameter of the battery housing 20 in the region where the beading portion 21 is formed is smaller than the diameter of the electrode assembly 10. One or more tab coupling portions 32 of the current collector 30, which will be described later, may be located below the beading portion 21. Alternatively, the tab coupling portions 32 may be located below the bottom surface of the beading portion 21.

According to an embodiment of the present disclosure, the beading portion 21 provides a support surface on which the housing cover 40 may be seated. In addition, the beading portion 21 may provide a support surface on which at least a portion of the peripheral edge of the current collector 30, which will be described later, may be seated and coupled. For example, at least a portion of the peripheral edge of the current collector 30 of the present disclosure and/or the peripheral edge of the housing cover 40 may be seated on the top surface of the beading portion 21. In order to stably support at least a portion of the peripheral edge of the current collector 30 and/or the peripheral edge of the housing cover 40, the top surface of the beading portion 21 may have a shape that extends along a substantially parallel direction to the bottom surface of the battery housing, for example, along a direction approximately perpendicular to the side wall of the battery housing 20.

According to an embodiment of the present disclosure, the beading portion 21 may serve as a support portion 31 configured to: prevent the electrode assembly 10, which may have a size approximately corresponding to the inner diameter of the battery housing 20, from being removed through the opening formed at the top of the battery housing 20; and allow the housing cover 40 to be seated thereon. The upper beading portion 21 may serve as a support portion 31 configured to fix, for example, a contact portion of the current collector 30 and a sealing gasket G1, in addition to the housing cover 40.

According to an embodiment of the present disclosure, the crimping portion 22 is formed above the beading portion 21. The crimping portion 22 has an extended and bent shape to surround the peripheral edge of the housing cover 40 disposed on the beading portion 21. Due to the shape of the crimping portion 22, the housing cover 40 is fixed on the beading portion 21.

Referring back to FIGS. 1 and 2, the current collector 30 according to an embodiment of the present disclosure is accommodated inside the battery housing 20, is electrically connected to the electrode assembly 10, and is also electrically connected to the battery housing 20. For example, the current collector 30 electrically interconnects the electrode assembly 10 and the battery housing 20.

Figure 4:
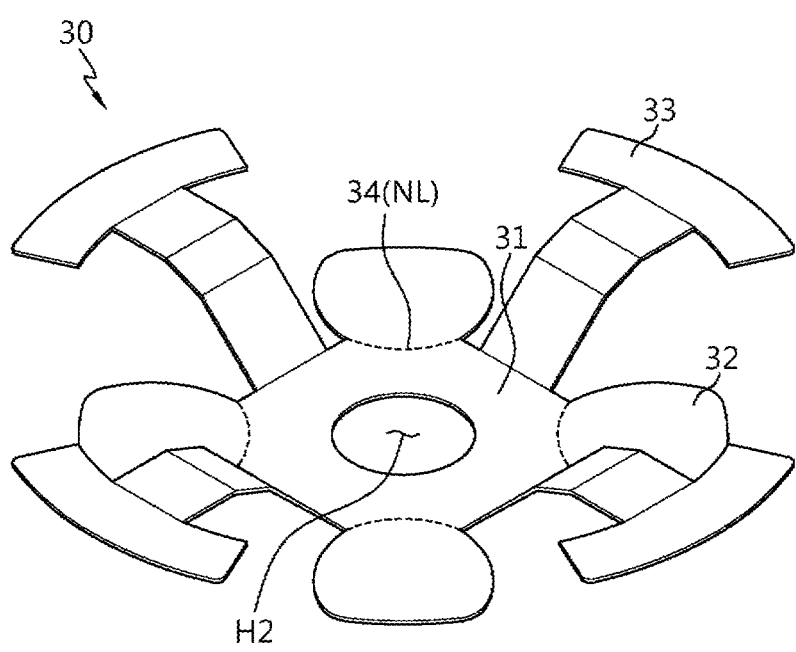
FIG. 4 is a perspective view illustrating a current collector according to an embodiment of the present disclosure.
Figure 5:
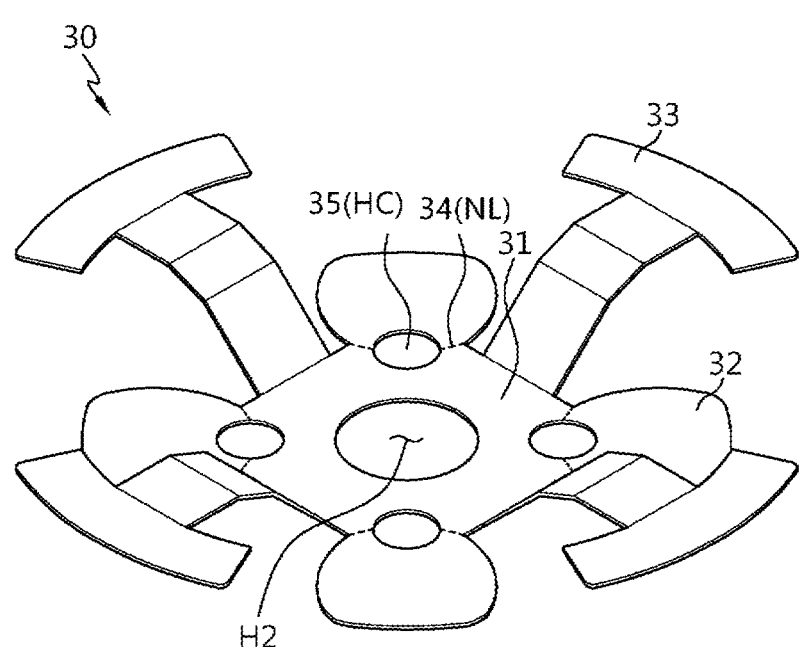
FIG. 5 is a perspective view illustrating a current collector according to another embodiment of the present disclosure.

FIG. 4 is a perspective view illustrating a current collector 30 according to an embodiment of the present disclosure, and FIG. 5 is a perspective view illustrating a current collector 30 according to another embodiment of the present disclosure. FIGS. 6 to 9 are perspective views illustrating current collectors 30 according to other embodiments of the present disclosure.

Referring to FIGS. 4 to 7, according to an embodiment of the present disclosure, the current collector 30 includes a support portion 31 located on one surface of the electrode assembly 10, tab coupling portions 32 extending from the support portion 31 and coupled to the first uncoated portion 11, and housing coupling portions 33 extending from the support portion 31 and coupled to the inner surface of the battery housing 20.

Referring to FIGS. 4 to 9, according to an embodiment of the present disclosure, a fracture portion 34 configured to have lower strength than the surrounding region may be provided at a boundary between the support portion 31 and each tab coupling portion 32. For example, the fracture portion 34 may be configured to be structurally weaker than the surrounding region. For example, the fracture portion 34 may be configured to have a thickness smaller than that of the surrounding region. Alternatively, the fracture portion 34 may be configured to have a lower density than the surrounding region. According to an embodiment of the present disclosure, the fracture portion 34 may include, for example, a notch line NL including a plurality of notches or a through hole HC.

With the structure in which the fracture portion 34 is provided at the boundary between the support portion 31 and each tab coupling portion 32 according to an embodiment of the present disclosure as described above, when a thermal runaway phenomenon occurs inside the battery cell 1 and a flame is generated and discharged, strong pressure may be applied to the fracture portion 34, causing fracture in the fracture portion 34. Accordingly, the support portion 31 of the current collector 30 may be separated from the tab coupling portions 32. For example, when the flame is discharged from the inside of the battery cell 1, the fracture portions 34 may be fractured to allow the tab coupling portions 32 of the current collector 30 to be separated. As a result, thanks to the fracture of the fracture portions 34, the flame generated inside the battery cell 1 may be smoothly discharged to the outside.

Referring to FIGS. 5 to 9, the current collector 30 according to an embodiment of the present disclosure may include through holes HC that passes through the current collector 30. The through holes HC may be circular as illustrated in FIG. 5, but the shape is not limited thereto. For example, the through holes HC may be configured in a polygonal shape other than a circle, such as a triangle or a square. The flame generated inside the battery cell 1 may be smoothly discharged through the through holes HC.

For example, when a thermal runaway phenomenon begins on the electrode assembly 10 side, since the current collector 30 is located above the electrode assembly 10, with the structure of the conventional battery cell 1, the flame generated from the electrode assembly 10 may not be discharged smoothly by being blocked by the current collector 30. Accordingly, there is a problem in that the flame moved toward the beading portion 21 located in a region near the electrode assembly 10 and the current collector 30, generating pinholes in the beading portion 21. When pinholes are formed in the beading portion 21, the possibility of directly damaging other battery cells 1 located around the battery cell 1 in which the fire occurred increases. Eventually, the spread of fire to other battery cells 1 may not be avoided.

According to an embodiment of the present disclosure, since the current collector 30 is provided with a through hole HC, the flame generated in the electrode assembly 10 may be discharged through the through hole HC. Accordingly, it is possible to prevent the flame from advancing toward the beading portion 21. According to the present disclosure, the beading portion 21 may eventually be prevented from being damaged by the flame. Alternatively, according to the present disclosure, pinholes may be effectively prevented from occurring in the beading portion 21.

According to an embodiment of the present disclosure, the through hole HC may be located on the notch line NL of the fracture portion 34. Since this structure includes both the fracture portion 34 and the through hole HC, the strength of the boundary region between the support portion 31 and the tab coupling portion 32 may be configured to be lower than the surrounding region in the strength compared to a structure including only one of the fracture portion and the through hole.

For example, referring to FIG. 5, since the through hole HC is provided on the current collector 30, the venting gas and/or flame formed due to thermal runaway on the electrode assembly 10 side may be smoothly discharged to the outside through the through hole HC.

Referring to FIG. 5 according to an embodiment of the present disclosure, when the through hole HC is formed in the boundary region between the support portion 31 and the tab coupling portion 32, since the material of the current collector 30 is removed from the region where the through hole HC is formed, the width of the connection portion of the boundary region between the support portion 31 and the tab coupling portion 32 may be reduced. Accordingly, the strength of the boundary region between the support portion 31 and the tab coupling portion 32 may be configured to be lower than that of the surrounding region. Accordingly, when venting gas formed due to thermal runaway or the like spurts upward from the electrode assembly 10, only the tab coupling portion 32 may be separated and fall off. Eventually, the flame generated in the electrode assembly 10 may be smoothly discharged through the empty space formed when the tab coupling portion 32 is separated.

Referring to FIG. 5 according to an embodiment of the present disclosure, when a notch line NL including a plurality of notches is formed in the boundary region between the support portion 31 and the tab coupling portion 32, since the thickness and/or density of the current collector 30 is reduced in the region where the notches are formed, the strength of the boundary region between the support portion 31 and the tab coupling portion 32 may be configured to be lower than that of the surrounding region. Accordingly, when venting gas formed due to thermal runaway or the like spurts upward from the electrode assembly 10, only the tab coupling portion 32 may be separated and fall off. Eventually, the flame generated in the electrode assembly 10 may be smoothly discharged through the empty space formed when the tab coupling portion 32 is separated.

Referring to FIG. 5, according to an embodiment of the present disclosure, the through hole HC may be configured to be located at the center of the boundary between the support portion 31 and the tab coupling portion 32. For example, the connection portions provided on the opposite sides of the through hole HC in the boundary region between the support portion 31 and the tab coupling portion 32 may be configured to have the same width.

With this structure, since the connection portions provided on the opposite sides of the through hole HC in the boundary region between the support portion 31 and the tab coupling portion 32 are configured to have the same width, the tab coupling portion 32 is pressed upward by venting gas, the same force may be applied to each connection portion. As a result, since all the connection portions are fractured, it is possible to prevent the tab coupling portion 32 from being incompletely separated due to fracture of only one connection portion.

At least one through hole HC according to another embodiment of the present disclosure may be provided on the support portion 31.

Figure 6:
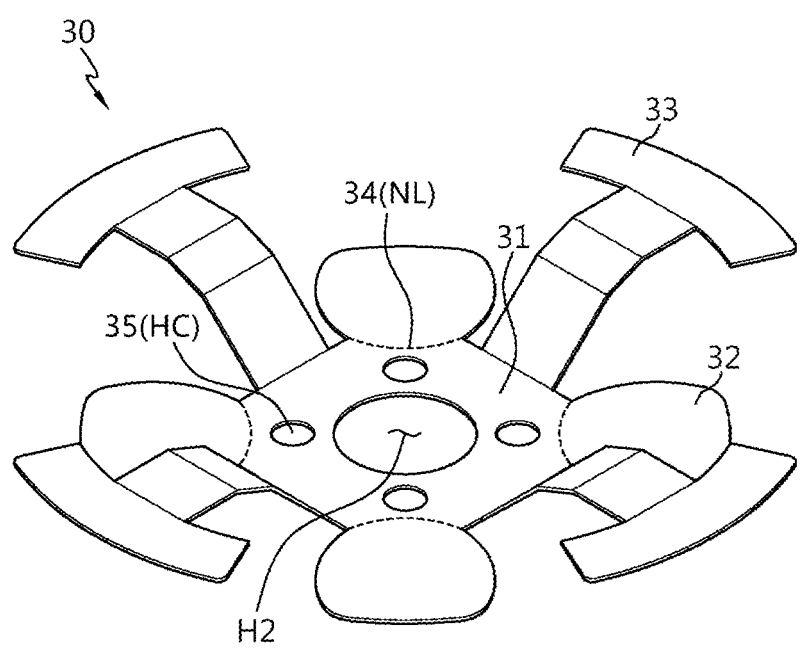
FIG. 6 is a perspective view illustrating a current collector according to another embodiment of the present disclosure.

For example, referring to FIG. 6, a plurality of through holes HC may be provided on the support portion 31 of the current collector 30. Meanwhile, the through holes HC may have a circular shape, for example, but is not necessarily limited thereto. For example, a plurality of through holes HC may be provided along the periphery of the current collector hole H2. For example, FIG. 6 illustrates an embodiment in which four through holes HC are provided along the periphery of the current collector hole H2.

In this way, when the through holes HC are provided on the support portion 31, venting gas and/or a flame generated from the electrode assembly 10 may be smoothly discharged to the outside. For example, since the current collector 30 covers the upper portion of the electrode assembly 10, in order for the gas and/or the flame to be discharged from the electrode assembly 10, a hole should be present on the current collector 30 or the current collector 30 should be separated. In this regard, according to an embodiment of the present disclosure, since a plurality of through holes HC are provided on the current collector 30, the gas and/or the flame generated from the electrode assembly 10 may be smoothly discharged. For example, the core side region of the electrode assembly 10 is covered by the support portion 31 of the current collector 30, in which, when a plurality of through holes HC are provided on the support portion 31, the venting gas and/or the flame generated in the core side region may be smoothly discharged upward.

According to another embodiment of the present disclosure, the tab coupling portion 32 may be provided with at least one through hole HC.

Figure 7:
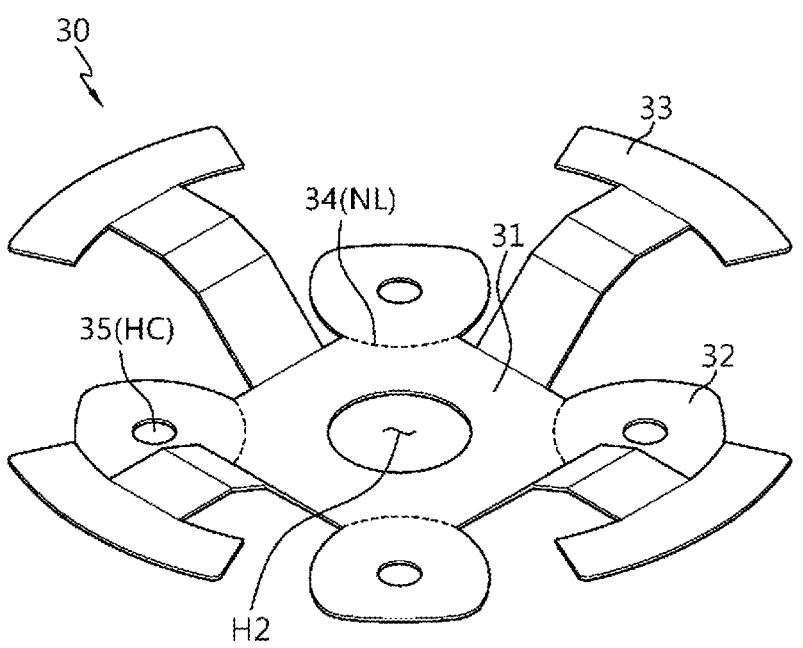
FIG. 7 is a perspective view illustrating a current collector according to another embodiment of the present disclosure.

For example, referring to FIG. 7, a through hole HC may be provided on each tab coupling portion 32 of the current collector 30. For example, FIG. 7 illustrates an embodiment in which a through hole HC is provided in each of the regions corresponding to the tab coupling portions 32.

In this way, when the through hole HC is provided on the tab coupling portion 32, the venting gas and/or the flame generated from the electrode assembly 10 may be smoothly discharged to the outside through the through hole HC. In particular, the outer circumference side region of the electrode assembly 10 is covered by the tab coupling portions 32 of the current collector 30, in which, when a plurality of through holes HC are provided on the tab coupling portions 32, the venting gas and/or the flame generated in the outer circumference side region may be smoothly discharged upward.

However, when too many through holes HC are provided on the tab coupling portions 32, the weldable regions between the tab coupling portions 32 and the electrode assembly 10 may be excessively reduced. In that case, considering that the welding area between the tab coupling portions 32 and the electrode assembly 10 may be reduced and the coupling strength may be weakened, an appropriate balance is required between the area of the tab coupling portions 32 and the number of through holes HC to be formed.

Figure 8:
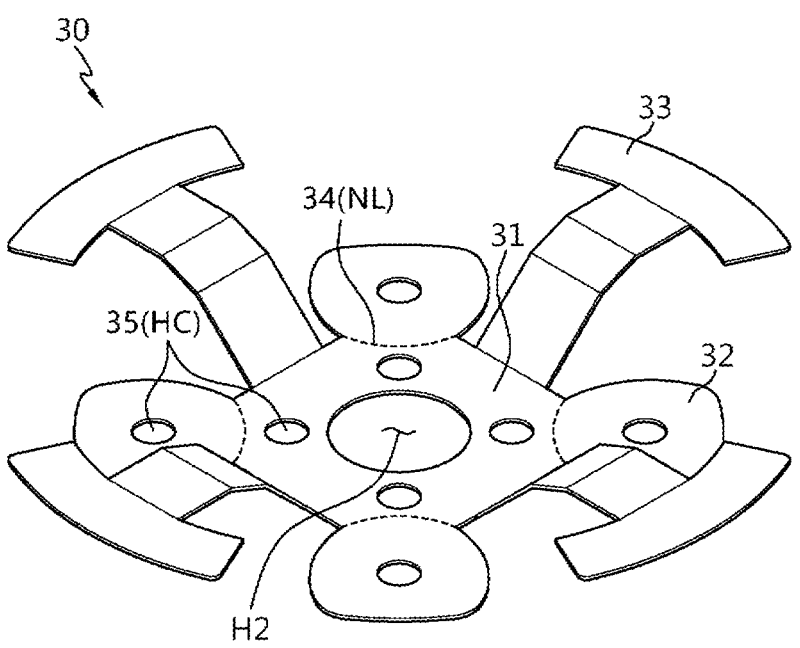
FIG. 8 is a perspective view illustrating a current collector according to another embodiment of the present disclosure.
Figure 9:
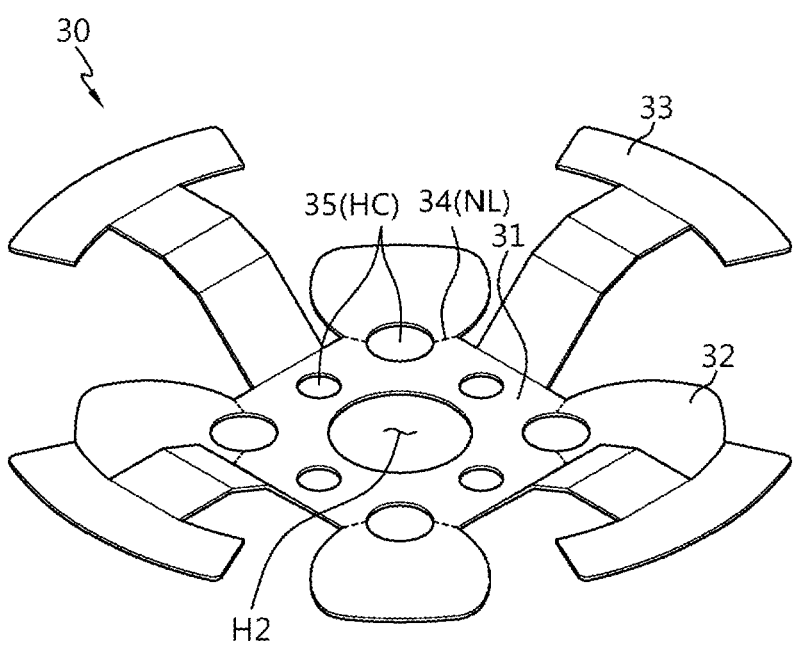
FIG. 9 is a perspective view illustrating a current collector according to another embodiment of the present disclosure.

Referring to FIG. 8, according to an embodiment of the present disclosure, through holes HC may be further provided on the tab coupling portions 32 of the current collector 30 while being provided on the support portion 31. Referring to FIG. 9, according to an embodiment of the present disclosure, through holes HC may be further provided on the support portion 31 while being formed in the boundary regions between the support portion 31 and the tab coupling portions 32. In addition, although not illustrated in the drawings, as another embodiment of the present disclosure, through holes HC may be further provided on the support portion 31 while being formed in the boundary regions between the support portion 31 and the tab coupling portions 32. Furthermore, the positions where the through holes HC are provided are not limited to the above-described embodiments, and may be provided at any position or combination of positions on the current collector 30 depending on a situation, and such embodiments should be considered to fall within the scope of the present disclosure.

According to an embodiment of the present disclosure, the notch line may be configured to have a curved shape. For example, referring to FIGS. 4 to 9, the notch line NL may be configured in the form of a curve convex toward the center of the current collector 30. Alternatively, although not illustrated in the drawings, the notch line NL may be configured in the form of a curve concave toward the center of the current collector 30. Alternatively, the notch line NL may be configured in a substantially linear shape. For example, the shape of the notch line NL is not limited to one shape and may have various shapes, and such various embodiments may be included in the scope of the present disclosure.

According to an embodiment of the present disclosure, each tab coupling portion 32 may be formed such that, compared to the width in the connection portion between the tab coupling portion 32 and the support portion 31, a position spaced apart from the connection portion toward the longitudinal end portion of the tab coupling portion 32 by a predetermined distance has a greater width. For example, referring to FIGS. 4 to 9, each tab coupling portion 32 may be configured to have a substantially fanwise shape in which, compared to the width in the connection portion between the tab coupling portion 32 and the support portion 31, a position spaced apart from the connection portion toward the longitudinal end portion of the tab coupling portion 32 by a predetermined distance has a greater width.

With this structure, the tab coupling portion 32 may be configured to have a small width in the connection portion between the tab coupling portion 32 and the support portion 31, and accordingly, the tab coupling portion 32 may be configured to have strength lower than that of the connection portion between the portion 32 and the support portion 31. Accordingly, when a thermal runaway phenomenon occurs inside the battery cell 1 and a flame is discharged, strong pressure may be applied to the connection portion between the tab coupling portions 32 and the support portion 31 so that the connection portion between the tab coupling portion 32 and the support portion 31 may be fractured. Accordingly, the support portion 31 of the current collector 30 may be separated from the tab coupling portions 32. For example, when a flame is discharged from the inside of the battery cell 1, the connection portion between each tab coupling portion 32 and the support portion 31 may be fractured so that the tab coupling portion 32 of the current collector 30 may be separated. As a result, the flame generated inside the battery cell 1 may be smoothly discharged to the outside due to the fracture of the connection portion between each tab coupling portion 32 and the support portion 31.

In addition, with this structure, since the width at a position spaced a predetermined distance away from a connection portion toward the longitudinal end portion of each tab coupling portion 32 is formed larger, the overall cross-sectional area of the tab coupling portion 32 may be ensured to be large. For example, since the tab coupling portion 32 has a substantially fanwise shape, a large contact area may be ensured between the tab coupling portion 32 and the electrode assembly 10. Accordingly, the tab coupling portions 32 and the electrode assembly 10 may be welded together smoothly. In addition, the contact area between each tab coupling portion 32 and the electrode assembly 10 becomes larger so that the internal resistance of the battery may be effectively reduced.

According to an embodiment of the present disclosure, the longitudinal end portion of the tab coupling portion 32 may have a substantially arc shape to correspond to the inner circumferential surface of the battery housing 20. For example, referring to FIGS. 4 to 9, the longitudinal end portion of each tab coupling portion 32 may be configured to have an arc shape so that the tab coupling portion 32 may be configured to have a substantially fanwise shape.

With this structure, since the longitudinal end of each tab coupling portion 32 may be configured to be further away from the center of the current collector 30, the overall cross-sectional area of the tab coupling portion 32 may be ensured to be large. For example, since the tab coupling portion 32 has a substantially fanwise shape, a large contact area may be ensured between the tab coupling portion 32 and the electrode assembly 10. Accordingly, the tab coupling portions 32 and the electrode assembly 10 may be welded smoothly. In addition, the contact area between each tab coupling portion 32 and the electrode assembly 10 becomes larger so that the internal resistance of the battery may be effectively reduced.

According to an embodiment of the present disclosure, the tab coupling portions 32 may be configured to have a larger width than the housing coupling portions 33. For example, referring to FIGS. 4 to 9, the tab coupling portions 32 are formed in a broad fanwise shape, while the housing coupling portions 33 may be configured to have a roughly rectangular band shape.

With this structure, the overall cross-sectional area of each tab coupling portion 32 may be ensured to be large. For example, the shape of each tab coupling portion 32 is configured to have a larger width than the housing coupling portion 33 so that the contact area between the tab coupling portion 32 and the electrode assembly 10 may be ensured to be large. Accordingly, the tab coupling portions 32 and the electrode assembly 10 may be welded smoothly. In addition, the contact area between each tab coupling portion 32 and the electrode assembly 10 becomes larger so that the internal resistance of the battery may be effectively reduced.

Meanwhile, in the foregoing, as an example of ensuring a large area of the tab coupling portions 32, the tab coupling portions 32 have a substantially fanwise shape, but the scope of the present disclosure is not limited thereto. Any shape that may ensure the contact area between the tab coupling portions 32 and the electrode assembly 10 above a certain level is within the scope of the present disclosure.

According to an embodiment of the present disclosure, the support portions 31 and the tab coupling portions 32 are disposed on the electrode assembly 10. The tab coupling portions 32 may be coupled to the first uncoated portion 11 of the electrode assembly 10. The tab coupling portions 32 may be coupled to the first uncoated portion 11 along, for example, the radial direction of the electrode assembly 10 by welding. For example, the tab coupling portions 32 may be welded to the first uncoated portion 11 in a state substantially parallel to the bottom surface of the battery housing 20. A weld bead may be formed between the first uncoated portion 11 and the tab coupling portions 32. For example, the weld bead may form a substantially linear welding pattern extending along the radial direction of the electrode assembly 10. For example, the welding pattern may have a line shape where spot welds are connected. The welding pattern may include one pattern or two or more patterns extending along the radial direction of the electrode assembly 10.

For example, the welding pattern may be configured to be substantially perpendicular to the notch line NL. Alternatively, as described above, the welding pattern may have a substantially linear shape along the radial direction from the center of the current collector 30. At this time, the notch line NL may be configured in a curved shape with a curvature convex toward the center of the current collector 30. The tangent line of the notch line NL at a point where the distance from the welding pattern to the notch line NL is the shortest may be configured to be substantially perpendicular to the welding pattern. For example, the welding pattern and the notch line NL may be configured to be substantially perpendicular to each other.

With this structure, an easy welding may be ensured during the process. In addition, with this structure, since the welding pattern is formed along the radial direction of the electrode assembly 10, it is possible to make current flow uniformly from the electrode assembly 10. In addition, with the above structure, the current path is shortened so that the resistance in the battery may be effectively reduced.

Referring to FIGS. 4 to 9, according to an embodiment of the present disclosure, the tab coupling portions 32 and the housing coupling portions 33 are indirectly connected via the support portion 31 and are not directly connected to each other. Therefore, when an external impact is applied to the battery cell 1 of the present disclosure, the possibility of damage occurring the coupling portions between the current collector 30 and the electrode assembly 10 and the coupling portions between the current collector 30 and the battery housing 20 may be minimized.

Referring to FIGS. 4 to 9, according to an embodiment of the present disclosure, one or more tab coupling portions 32 and/or one or more housing coupling portions 33 may be provided. The one or more tab coupling portions 32 and the one or more housing coupling portions 33 may be arranged, for example, in a substantially radial shape, a cross shape, or a combination thereof with respect to the center of the current collector 30. In another aspect, each of the plurality of housing coupling portions 33 may be disposed between adjacent ones of the tab coupling portions 32.

Referring again to FIGS. 3 and 4, according to an embodiment of the present disclosure, the support portion 31 and the plurality of tab coupling portions 32 are disposed on the electrode assembly 10. For example, the tab coupling portions 32 are coupled to the first uncoated portion 11 of the electrode assembly 10. The tab coupling portions 32 may be coupled to the first uncoated portion 11 along, for example, the radial direction of the electrode assembly 10 by welding. For example, the tab coupling portions 32 may be welded to the first uncoated portion 11 in a state substantially parallel to the bottom surface of the battery housing 20. The welding portions formed between the first uncoated portion 11 and the tab coupling portion 32 may form, for example, substantially linear welding patterns extending along the radial direction of the electrode assembly 10.

According to an embodiment of the present disclosure, not only the tab coupling portions 32 but also the support portions 31 may be coupled to the first uncoated portion 11. The tab coupling portions 32 and the first uncoated portion 11 may be coupled by welding. When the beading portion 21 is formed in the battery housing 20, the support portions 31 and the tab coupling portions 32 are located below the beading portion 21.

For example, the support portion 31 may include a current collector hole H2 formed at a position corresponding to the winding hole H1 formed substantially at the center of the electrode assembly 10. The winding hole H1 and the current collector hole H2, which communicate with each other, may serve as a passage for insertion of a welding rod or emission of a laser beam for welding between a terminal and the second current collector 30 or between the terminal and a lead tab (not illustrated). The current collector hole H2 may have a diameter that is substantially equal to or larger than that of the winding hole H1 of the electrode assembly 10 so as to prevent the winding hole H1 in the core of the electrode assembly 10 from being covered. Considering that, when the diameter of the current collector hole H2 is excessively smaller than the diameter of the winding hole H1, the hole winding hole H1 may be covered and liquid injectability may be reduced, and it may be difficult to ensure a sufficient space for laser emission, the diameter of the current collector hole H2 and the diameter of the winding hole H1 may be adjusted appropriately.

According to an embodiment of the present disclosure, the plurality of tab coupling portions 32 may have a shape extending substantially radially from the support portion 31 of the current collector 30 toward the side wall of the battery housing 20. The plurality of tab coupling portions 32 may be located to be spaced apart from each other along the circumference of the support portion 31.

According to an embodiment of the present disclosure, the plurality of housing coupling portions 33 may have a shape extending substantially radially from the support portion 31 of the current collector 30 toward the side wall of the battery housing 20. The plurality of housing coupling portions 33 may be located to be spaced apart from each other along the circumference of the support portion 31. At least one housing coupling portion 33 may be located between adjacent ones of the tab coupling portions 32.

For example, the housing coupling portions 33 may extend from the support portion 31 and be electrically coupled to the inner surface of the battery housing 20. For example, the housing coupling portions 33 may be coupled to the inner surface of the battery housing 20, for example, to the beading portion 21. In particular, the housing coupling portions 33 may be coupled to the top surface of the beading portion 21.

Alternatively, the housing coupling portions 33 may include contact portions coupled to the inner surface of the battery housing 20 and connections portion interconnecting the support portion 31 and the contact portions.

According to an embodiment of the present disclosure, the contact portions are coupled to the inner surface of the battery housing 20. When the beading portion 21 is formed in the battery housing 20, the contact portion may be coupled on the beading portion 21. In this case, for stable contact and coupling, both the beading portion 21 and the contact portion may have a shape extending along a direction substantially parallel to the bottom surface of the battery housing 20, i.e., a direction substantially perpendicular to the side wall of the battery housing 20.

According to an embodiment of the present disclosure, the contact portions may be welded to the top surface of the beading portion 21. For example, the welded portions may be formed in the top surface region of the beading portion 21. The welded portions formed between the contact portions and the beading portion 21 may be formed narrower than the top surface of the beading portion 21. The welding for coupling the battery housing 20 and the current collector 30 may include, for example, laser welding, ultrasonic welding, or spot welding.

Figure 10:
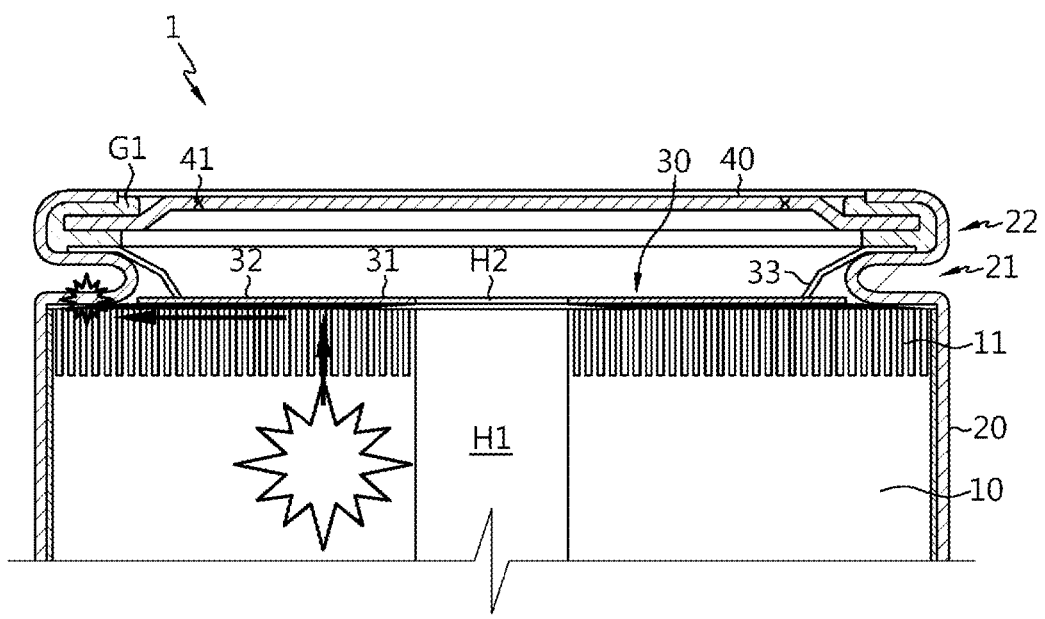
FIG. 10 is a view illustrating a case where thermal runaway occurs in a battery cell to which a conventional current collector is applied.

FIG. 10 is a view illustrating a case where thermal runaway occurs in a battery cell 1 to which a conventional current collector 30 is applied.

The battery cell 1 in the related art illustrated in FIG. 10 includes a current collector 30, and the current collector 30 does not include any holes other than the centrally located current collector hole H2. With the structure of the current collector 30 in the related art, a flame generated in the electrode assembly 10 is blocked by the current collector 30 and may not be discharged smoothly. Accordingly, there may be a problem in that the flame moves toward the beading portion 21 located in a region near the electrode assembly 10 and the current collector 30, generating pinholes in the beading portion 21. When the pinholes are formed in the beading portion 21, there is a high possibility of direct damage to other battery cells 1 located around the battery cell 1 where the fire occurred, and eventually, fire spread to the other battery cells 1 may not be avoided.

Figure 11:
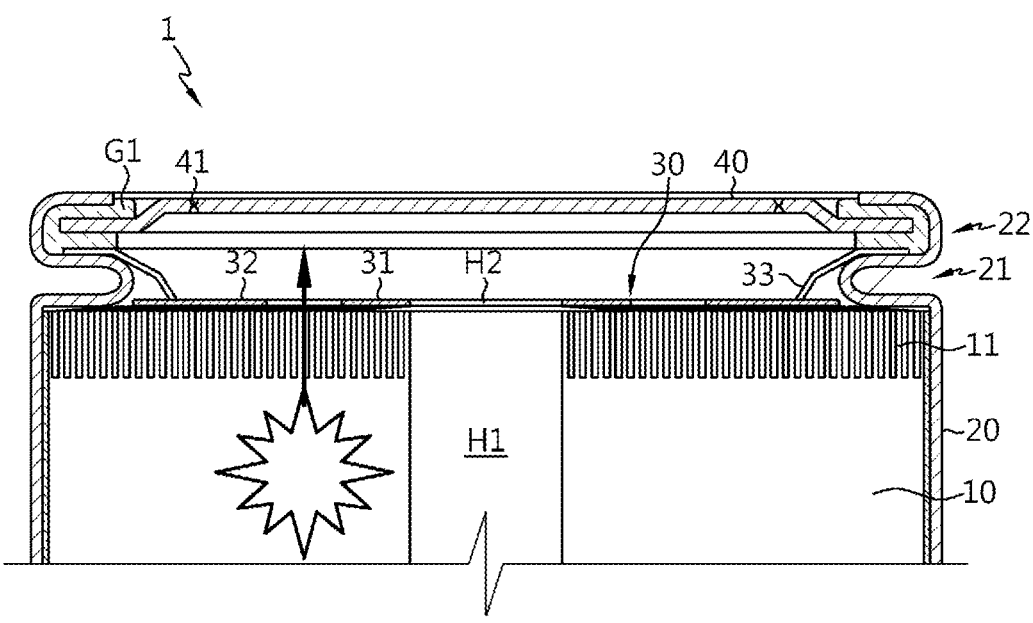
FIG. 11 is a view illustrating a case where thermal runaway occurs in a battery cell according to an embodiment of the present disclosure.

FIG. 11 is a view illustrating a case where thermal runaway occurs in a battery cell 1 according to an embodiment of the present disclosure.

The battery cell 1 according to an embodiment of the present disclosure illustrated in FIG. 11 includes a current collector 30 having fracture portions 34. The current collector 30 may have through holes HC. With this structure, a flame generated in the electrode assembly 10 may be discharged to the outside of the electrode assembly 10 through the through holes HC. Accordingly, it is possible to prevent the flame from advancing toward the beading portion 21. According to the present disclosure, the beading portion 21 may eventually be prevented from being damaged by the flame. Alternatively, according to an embodiment of the present disclosure, pinholes may be effectively prevented from being generated in the beading portion 21.

Figure 12:
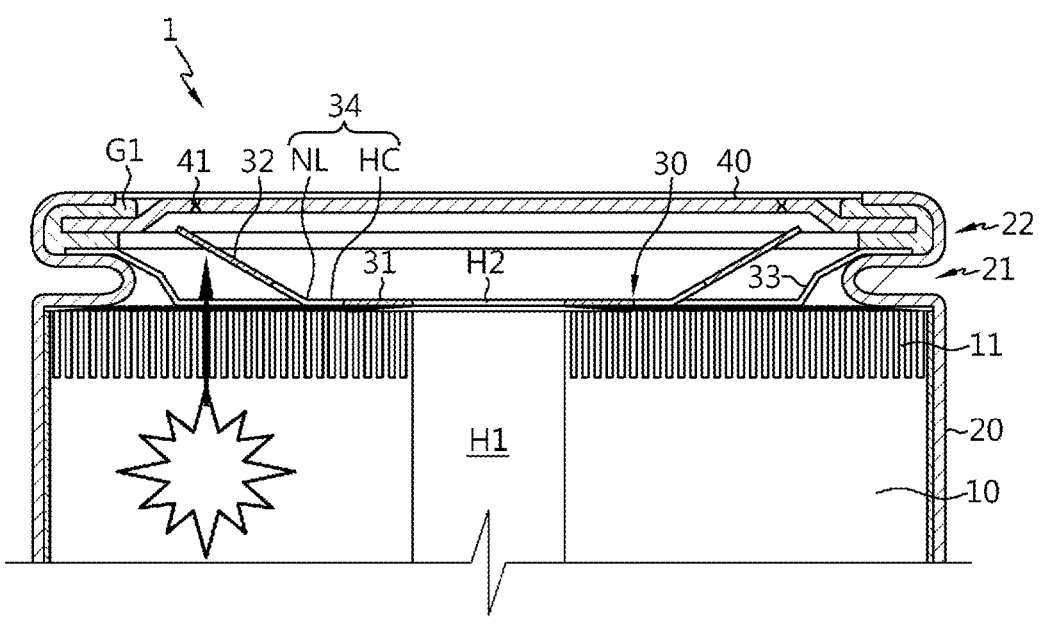
FIG. 12 is a view illustrating another case where thermal runaway occurs in a battery cell according to an embodiment of the present disclosure.
Figure 13:
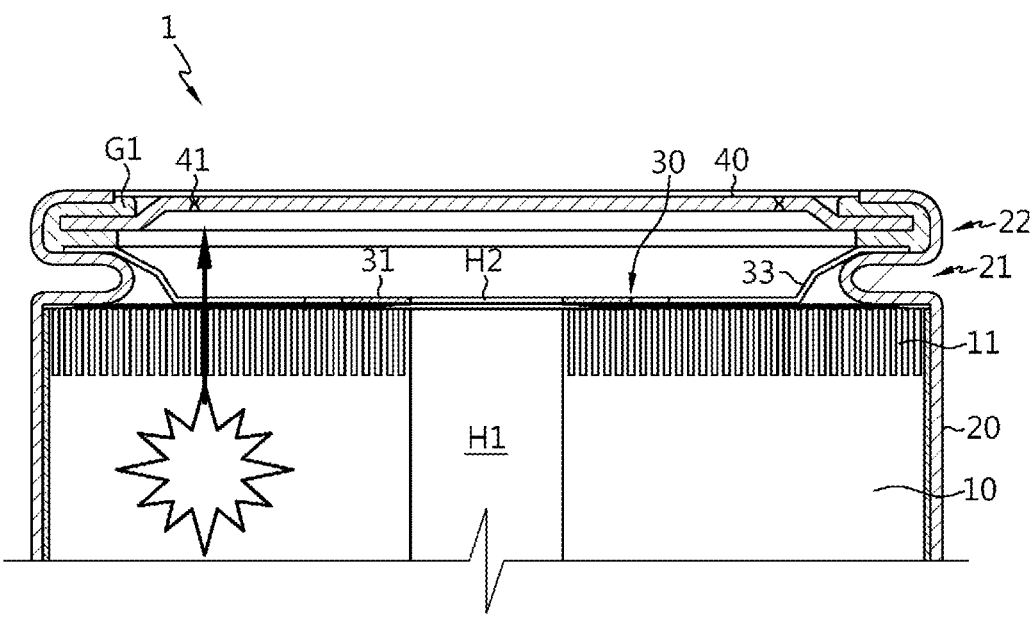
FIG. 13 is a view illustrating another case where thermal runaway occurs in a battery cell according to an embodiment of the present disclosure.

FIG. 12 is a view illustrating another case where thermal runaway occurs in a battery cell 1 according to an embodiment of the present disclosure, and FIG. 13 is a view illustrating another case where thermal runaway occurs in a battery cell 1 according to an embodiment of the present disclosure.

Since the current collectors 30 illustrated in FIGS. 12 and 13 are similar to the current collectors 30 of the previous embodiments, redundant descriptions of components which are substantially the same or similar to the previous embodiments will be omitted, and hereinafter, the current collector 30 will be described focusing on differences from the previous embodiments.

Referring to FIG. 12, according to an embodiment of the present disclosure, a notch line NL including a plurality of notches may be formed in the boundary region between the support portion 31 and each tab coupling portion 32. With this structure, when venting gas formed due to, for example, thermal runaway spurts upward from the electrode assembly 10, the tab coupling portions 32 receive an upward pressure from the venting gas so that the tab portions 32 may be bent upward with respect to the notch line NL. When the tab coupling portions 32 are bent upward, the flame generated in the electrode assembly 10 may be smoothly discharged through the empty spaces formed between the electrode assembly 10 and the tab coupling portions 32.

FIG. 13 is a view illustrating a case where venting gas spurts more powerfully according to an embodiment of the present disclosure, than in the case of FIG. 12. In the embodiment of FIG. 13, the tab coupling portions 32 receives an upward pressure from the venting gas, and as a result, the tab coupling portions 32 may be separated from the current collector 30 along the notch line NL and fall off.

The flame generated in the electrode assembly 10 may be smoothly discharged eventually through the empty spaces formed when the tab coupling portions 32 are separated.

In this way, in an embodiment of the present disclosure, with the structure provided with a through hole HC and/or a notch line NL at the boundary between the support portion 31 and each tab coupling portions 32, a flame generated in 10 may be smoothly discharged to the outside. Accordingly, the flame may be prevented from spreading to the beading portion 21 located near the side portions of the electrode assembly 10 and the current collector 30. As a result, with the structure of the present disclosure, damage such as a pinhole phenomenon may be prevented from occurring in the beading portion 21.

Referring back to FIGS. 1 to 3, according to an embodiment of the present disclosure, the housing cover 40 has a venting portion 41 formed to prevent an increase in internal pressure due to the gas generated inside the battery housing 20. The venting portion 41 may be configured to be fractured when the internal pressure of the battery housing 20 increases to a predetermined level or higher. For example, the venting portion 41 may be formed in a portion of the housing cover 40 and be a structurally weaker region than the surrounding region to be easily fractured when the internal pressure is applied. For example, the venting portion 41 may be a region with a thinner thickness compared to the surrounding region. Referring to FIGS. 1 and 2, the venting portion 41 may form a substantially circular closed loop.

Referring back to FIGS. 1 to 3 according to an embodiment of the present disclosure, the housing cover 40 covers the opening formed at one side of the battery housing 20. The housing cover 40 may be fixed by the crimping portion 22 formed at the top of the battery housing 20. In this case, a sealing gasket G1 may be interposed between the battery housing 20 and the housing cover 40 and between the current collector 30 and the housing cover 40 to improve the fixing force and the sealing property of the battery housing 20. In this case, the contact portion may be interposed between the beading portion 21 of the battery housing 20 and the sealing gasket G1. In this way, the contact portion interposed between the beading portion 21 and the sealing gasket G1 may be fixed by bending the crimping portion 22 extending upward from the beading portion 21.

According to an embodiment of the present disclosure, a battery module includes a plurality of battery cells, of which the basic unit cells are the cells to which various embodiments of the present disclosure are applied so that a flame generated inside the battery cells may be smoothly discharged when thermal runaway occurs, and includes a battery assembly in which the plurality of battery cells are electrically connected, and a module housing accommodating the battery assembly. Alternatively, the battery module is used to supply power to an energy storage system.

Figure 14:
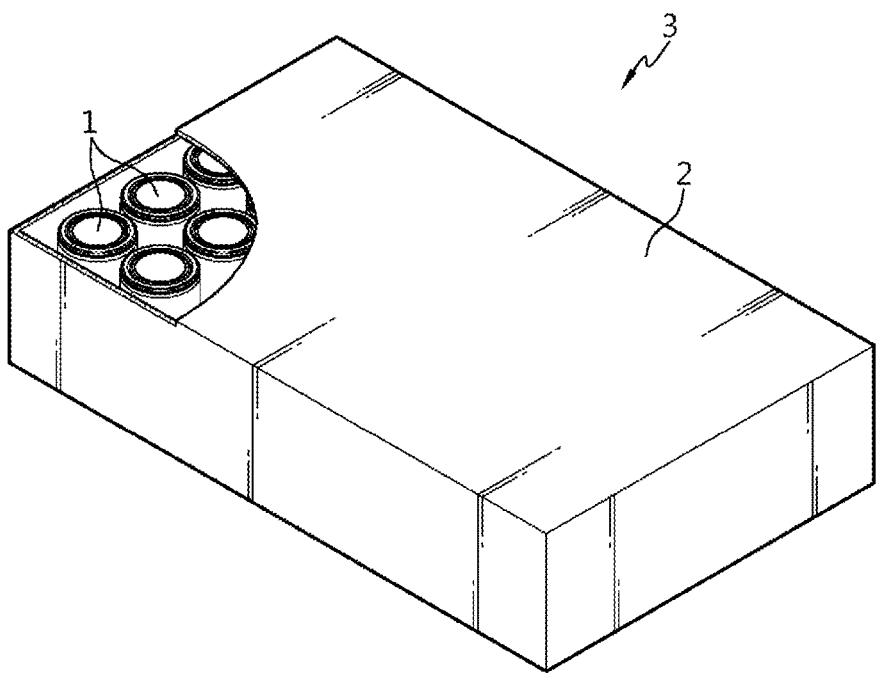
FIG. 14 is a view illustrating a battery pack including battery cells according to an embodiment of the present disclosure.

FIG. 14 is a view illustrating a battery pack 3 including battery cells 1 according to an embodiment of the present disclosure.

Referring to FIG. 14, the battery pack 3 according to an embodiment of the present disclosure includes a battery assembly in which a plurality of battery cells 1 according to an embodiment of the present disclosure are electrically connected as described above, and a pack housing 2 configured to accommodate the battery assembly. In the drawings of the present disclosure, components such as bus bars for electrical connection, cooling units, and power terminals are omitted for convenience of illustration.

Figure 15:
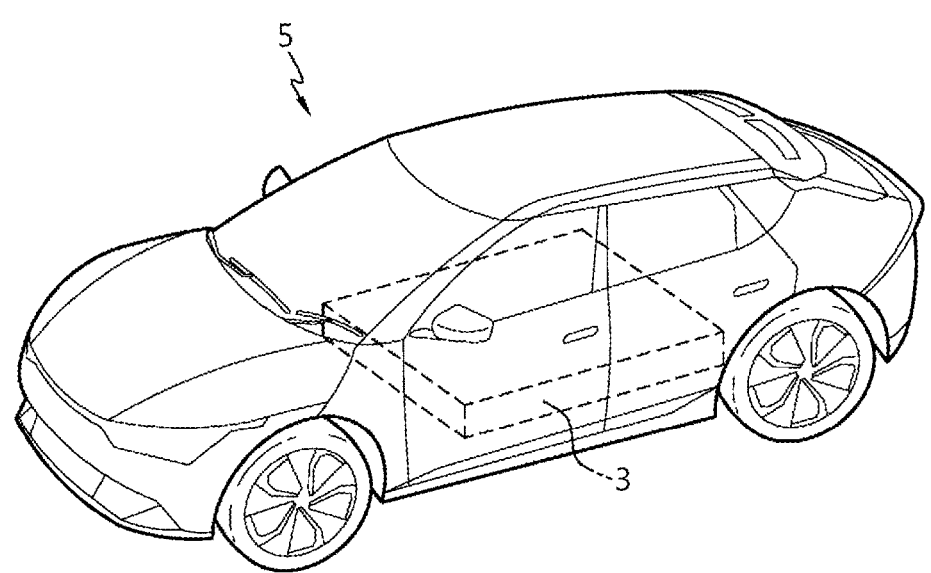
FIG. 15 is a view illustrating a vehicle including the battery pack of FIG. 14.

FIG. 15 is a view illustrating a vehicle 5 including the battery pack 3 of FIG. 14.

Referring to FIG. 15, the vehicle 5 according to an embodiment of the present disclosure may be, for example, an electric vehicle, a hybrid vehicle, or a plug-in hybrid vehicle, and includes the battery pack 3 according to an embodiment of the present disclosure. The vehicle 5 includes a four-wheeled vehicle and a two-wheeled vehicle. The vehicle 5 operates by receiving power from the battery pack 3 according to an embodiment of the present disclosure.

While the present disclosure has been described above with reference to several embodiments thereof, the present disclosure is not limited by the embodiments, and various changes and modifications may be made by a person ordinarily skilled in the art without departing from the technical spirit and equivalent scope of the present disclosure as defined by the appended claims.

What is claimed is:

1. A battery cell comprising:
an electrode assembly including a first electrode and a second electrode with a separator interposed therebetween, and the first electrode, second electrode and separator being wound around a winding axis in a winding direction to define a core and an outer peripheral surface, wherein the first electrode includes a first uncoated portion, which is not coated with an active material layer, along the winding direction;
a battery housing having an opening at one side thereof and configured to accommodate the electrode assembly through the opening; and
a current collector including a support portion disposed directly on the electrode assembly, a tab coupling portion extending from the support portion and directly coupled to the first uncoated portion, and a housing coupling portion extending from the support portion and electrically coupled to an inner surface of the battery housing,
wherein a fracture portion configured to have lower strength than a surrounding region is provided at a boundary between the support portion and the tab coupling portion, and
wherein the fracture portion is configured to be fractured to allow the tab coupling portion to be separated from the support portion.

2. The battery cell according to claim 1, wherein the fracture portion includes a notch line including a plurality of notches.

3. The battery cell according to claim 2, wherein the current collector includes a through hole that passes through the current collector.

4. The battery cell according to claim 3, wherein the through hole is located on the notch line.

5. The battery cell according to claim 3, wherein the through hole is located at a center of the boundary between the support portion and the tab coupling portion.

6. The battery cell according to claim 3, wherein at least one through hole is provided on the support portion.

7. The battery cell according to claim 3, wherein at least one through hole is provided on the tab coupling portion.

8. The battery cell according to claim 2, wherein the notch line has a curved shape.

9. The battery cell according to claim 1, wherein the tab coupling portion has a larger width than the housing coupling portion.

10. The battery cell according to claim 2, wherein the first uncoated portion and the tab coupling portion are coupled by welding along a radial direction of the electrode assembly.

11. The battery cell according to claim 10, wherein a weld bead is formed between the first uncoated portion and the tab coupling portion, and wherein the weld bead forms a linear welding pattern extending along the radial direction of the electrode assembly.

12. The battery cell according to claim 11, wherein the welding pattern is configured to be perpendicular to the notch line.

13. A battery pack comprising at least one battery cell of claim 1.

14. A vehicle comprising at least one battery pack of claim 13.

15. A battery module comprising at least one battery cell of claim 1.

16. An energy storage system comprising at least one battery module of claim 15.

17. The battery cell according to claim 1, wherein the battery housing is a cylindrical housing.

18. A current collector comprising:

a support portion disposed directly on an electrode assembly;

a tab coupling portion extending from the support portion and directly coupled to a first uncoated portion; and a housing coupling portion extending from the support portion and electrically coupled to an inner surface of a battery housing, wherein a fracture portion configured to have lower strength than a surrounding region is provided at a boundary between the support portion and the tab coupling portion, and wherein the fracture portion is configured to be fractured to allow the tab coupling portion to be separated from the support portion.

\* \* \* \* \*